(12) United States Patent
Lee et al.

(10) Patent No.: US 12,474,109 B2
(45) Date of Patent: Nov. 18, 2025

(54) REFRIGERATOR

(71) Applicant: SAMSUNG ELECTRONICS CO., LTD., Suwon-si (KR)

(72) Inventors: Seungmin Lee, Suwon-si (KR); Jeongman Nam, Suwon-si (KR); Sangchul Ryu, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 214 days.

(21) Appl. No.: 18/216,971

(22) Filed: Jun. 30, 2023

(65) Prior Publication Data

US 2023/0341170 A1     Oct. 26, 2023

Related U.S. Application Data

(63) Continuation of application No. PCT/KR2021/019200, filed on Dec. 16, 2021.

(30) Foreign Application Priority Data

Feb. 10, 2021   (KR) .......................... 10-2021-0018800

(51) Int. Cl.
*F25D 21/14* (2006.01)
*F25D 11/02* (2006.01)

(52) U.S. Cl.
CPC .............. *F25D 21/14* (2013.01); *F25D 11/02* (2013.01); *F25D 2321/143* (2013.01); *F25D 2321/1441* (2013.01)

(58) Field of Classification Search
CPC ........... F25D 23/065; F25D 2321/1441; F25D 2321/143; F25D 11/02; F25D 21/14
See application file for complete search history.

(56) References Cited

U.S. PATENT DOCUMENTS

| | | |
|---|---|---|
| 10,161,668 B2 | 12/2018 | Sim et al. |
| 10,852,049 B2 | 12/2020 | Yi et al. |
| (Continued) | | |

FOREIGN PATENT DOCUMENTS

| | | |
|---|---|---|
| CN | 105222480 A | 1/2016 |
| JP | 62-206371 A | 9/1987 |
| (Continued) | | |

OTHER PUBLICATIONS

Communication issued on May 7, 2024 by the European Patent Office for European Patent Application No. 21925927.2.

(Continued)

*Primary Examiner* — Ana M Vazquez
(74) *Attorney, Agent, or Firm* — Sughrue Mion, PLLC

(57) ABSTRACT

A refrigerator includes: an inner case defining a storage room; an outer case coupled to an outer side of the inner case; an insulator between the inner case and the outer case; an evaporator disposed on a rear inner surface of the inner case; and a drain device disposed below the evaporator and configured to drain defrost water falling from the evaporator, wherein the drain device may include: an upper insulator disposed on the rear inner surface of the inner case; a drain housing disposed below the upper insulator and through with the defrost water is drained; and a middle insulator disposed on a lower portion of the upper insulator, such that the drain housing is between the upper insulator and the middle insulator, the middle insulator including a fixing portion to which the drain housing is fixed.

15 Claims, 12 Drawing Sheets

(56) References Cited

U.S. PATENT DOCUMENTS

| | | |
|---|---|---|
| 11,060,787 B2 | 7/2021 | Seo |
| 11,353,255 B2 | 6/2022 | Hwang et al. |
| 2022/0221215 A1 | 7/2022 | Kang et al. |

FOREIGN PATENT DOCUMENTS

| | | | |
|---|---|---|---|
| JP | 63-92186 U | | 6/1988 |
| JP | 6-249568 A | | 9/1994 |
| JP | 7-239169 A | | 9/1995 |
| JP | 11-132625 A | | 5/1999 |
| JP | 11-132640 A | | 5/1999 |
| JP | H11132640 A | * | 5/1999 |
| JP | 11-173743 A | | 7/1999 |
| JP | 2002-24927 A | | 1/2002 |
| JP | 2013-11392 A | | 1/2013 |
| KR | 20-0111200 Y1 | | 5/1996 |
| KR | 10-1997-0011728 A | | 3/1997 |
| KR | 19980029531 U | * | 8/1998 |
| KR | 20-0158929 Y1 | | 10/1999 |
| KR | 20-2000-0011267 U | | 6/2000 |
| KR | 20-0267946 Y1 | | 3/2002 |
| KR | 10-0759045 B1 | | 9/2007 |
| KR | 10-2010-0107171 A | | 10/2010 |
| KR | 10-2012-0013658 A | | 2/2012 |
| KR | 10-2015-0124111 A | | 11/2015 |
| KR | 10-2017-0093581 A | | 8/2017 |
| KR | 10-2018-0112267 A | | 10/2018 |
| KR | 10-2019-0070791 A | | 6/2019 |
| KR | 10-2020-0050113 A | | 5/2020 |
| KR | 10-2020-0076466 A | | 6/2020 |

OTHER PUBLICATIONS

International Search Report (PCT/ISA/210) issued by the International Searching Authority on Apr. 14, 2022 in corresponding International Application No. PCT/KR2021/019200.

* cited by examiner

REFRIGERATOR

CROSS-REFERENCE TO RELATED APPLICATION(S)

This application is a Bypass Continuation Application of International Application No. PCT/KR2021/019200, filed on Dec. 16, 2021, which is based on and claims priority to Korean Patent Application No. 10-2021-0018800, filed on Feb. 10, 2021, in the Korean Intellectual Property Office, the disclosures of which are incorporated by reference herein in their entireties.

BACKGROUND

1. Field

The disclosure relates to a refrigerator having a drain device for draining defrost water falling from an evaporator.

2. Description of Related Art

A refrigerator is an appliance that includes a main body having a storage room and a cool air supply system for supplying cool air to the storage room to keep food fresh. The storage room includes a refrigerating room that is maintained at about 0° C. to 5° C. to keep food refrigerated and a freezing room that is maintained at about 0° C. to 30° C. below zero to keep food frozen. On the front side of the main body, a door is provided to open or close the storage room. The door is rotatably provided on the front side of the main body to open or close the storage room. Also, the door is provided as a drawer type door to open or close the storage room.

The refrigerator includes an evaporator in the rear side of the storage room and the evaporator generates cool air according to an operation of a compressor installed in the machine room, wherein the cool air freezes/refrigerates the inside of each room according to a flow of the cool air that is forcedly blown to the freezing room and the refrigerating room by a blow fan and then returns, thereby keeping food stored inside the corresponding room fresh for a long time.

In the process of the cool air flow, the vapor around the evaporator is saturated in the air due to a temperature difference between cool air being at an extremely low temperature around the evaporator and warm air being at an increased temperature by exchanging heat with stored items accommodated inside the room while circulating inside the room. That is, the vapor reaches the dew point so as to be no longer saturated in the air around the evaporator and forms the dew on the surface of the evaporator. The dew is frozen by the low temperature of the surface of the evaporator to change into frost.

Accordingly, the refrigerator interrupts, upon satisfaction of a preset condition during an operation, all operations, and drives a defrost heater installed below the evaporator to perform a defrosting process for removing frost formed on the surface of the evaporator.

During the defrosting process, the frost melts to generate defrost water and the defrost water falls to a drain device disposed below the evaporator and is drained to the outside of the refrigerator.

The drain device includes a drain housing to which defrost water falls, and insulators disposed on the upper and lower portions of the drain housing. The drain device is assembled with the inner case by assembling the insulator disposed on the upper portion of the drain housing with the rear plate of the inner case. In this case, the drain housing is fixed to the insulator disposed on the lower portion of the drain housing. The drain housing is attached on the insulator by a tape, an adhesive, etc. to be prevented from being detached from the insulator.

However, because the insulator is formed of Expanded PolyStyrene (EPS) and the drain housing is formed of aluminum, it may be difficult to attach the drain housing to the insulator by a tape, etc. Also, in the case in which the drain housing is not thoroughly washed, the tape may come off.

SUMMARY

Provided are a refrigerator which fixes a drain housing directly to an insulator without using a separate attachment.

According to an aspect of the disclosure, a refrigerator includes: an inner case defining a storage room; an outer case coupled to an outer side of the inner case; an insulator between the inner case and the outer case; an evaporator disposed on a rear inner surface of the inner case; and a drain device disposed below the evaporator and configured to drain defrost water falling from the evaporator, wherein the drain device may include: an upper insulator disposed on the rear inner surface of the inner case; a drain housing disposed below the upper insulator and through with the defrost water is drained; and a middle insulator disposed on a lower portion of the upper insulator, such that the drain housing is between the upper insulator and the middle insulator, the middle insulator including a fixing portion to which the drain housing is fixed.

The fixing portion may include: a rib provided in an upper portion of the middle insulator and a rectangular shape; and a plurality of fixing protrusions protruding from an upper portion of the rib toward the upper insulator.

The middle insulator may include an accommodating portion in which the drain housing is accommodated, and the fixing portion is provided at an upper edge of the accommodating portion.

The drain housing may have a rectangular trough shape and an upper side of the drain housing opens, and the drain housing may include an extension portion extending from an upper portion of each of four sides of the drain housing to correspond to the rib.

The extension portion may include a plurality of fixing holes which the plurality of fixing protrusions penetrate and are fixed to.

The upper insulator may include a plurality of fixing grooves provided in the lower portion of the upper insulator to correspond to the plurality of fixing holes, and the plurality of fixing protrusions may be fixed to the plurality of fixing grooves.

The upper insulator may press an upper portion of the drain housing disposed between the upper insulator and the middle insulator such that the drain housing contacts the middle insulator.

The extension portion may be inclined such that the defrost water flows to inside of the drain housing.

The fixing portion may include a fixing rib formed integrally with an upper portion of the middle insulator, the fixing rib having rectangular shape and protruding toward the upper insulator.

The drain housing may have a rectangular trough shape of which an upper side is open, and the drain housing may include a bending portion extending from an upper portion of each of four sides of the drain housing to correspond to the fixing rib.

The bending portion may have a "⊏" shape of which a lower side is open such that the fixing rib is inserted in and fixed to the bending portion.

The upper insulator may include an inserting groove provided in the lower portion of the upper insulator to correspond to the fixing rib, and the fixing rib may be inserted in and fixed to the inserting groove.

The fixing portion may include: a plurality of fixing protrusions protruding from at least one surface of upper surfaces of the middle insulator toward the upper insulator; and a fixing rib integrally formed with the middle insulator in a remaining upper surface of the middle insulator and protrudes toward the upper insulator.

The drain housing may have a rectangular trough shape of which an upper side is open, the drain housing may include an extension portion and a bending portion, a plurality of fixing holes may be provided at locations corresponding to the plurality of fixing protrusions in the extension portion, the plurality of fixing protrusions may penetrate the plurality of fixing holes, the bending portion may be provided at a location corresponding to the fixing rib, and the fixing rib may be inserted in the bending portion.

The upper insulator may include a plurality of fixing grooves and an inserting groove.

The plurality of fixing grooves may be provided in the lower portion of the upper insulator to correspond to the plurality of fixing holes The plurality of fixing protrusions may be fixed to the plurality of fixing grooves.

The inserting groove may be provided in the lower portion of the upper insulator to correspond to the fixing rib, and the fixing rib may be inserted in and fixed to the inserting groove.

According to one or more embodiments of the disclosure, a reworking time caused by deformation of the drain housing, which occurs by detachment of the drain housing, may be reduced, thereby uniformity of working may be achieved and productivity may be improved.

Also, according to one or more embodiments of the disclosure, the pin of the evaporator may be prevented from being deformed because the evaporator is caught by the drain housing during assembling, which may improve performance and quality.

Also, according to one or more embodiments of the disclosure, an assembly time of the drain device may be reduced to improve productivity.

BRIEF DESCRIPTION OF DRAWINGS

The above and other aspects and features of certain embodiments of the present disclosure will be more apparent from the following description taken in conjunction with the accompanying drawings, in which.

DETAILED DESCRIPTION

Figure 1:
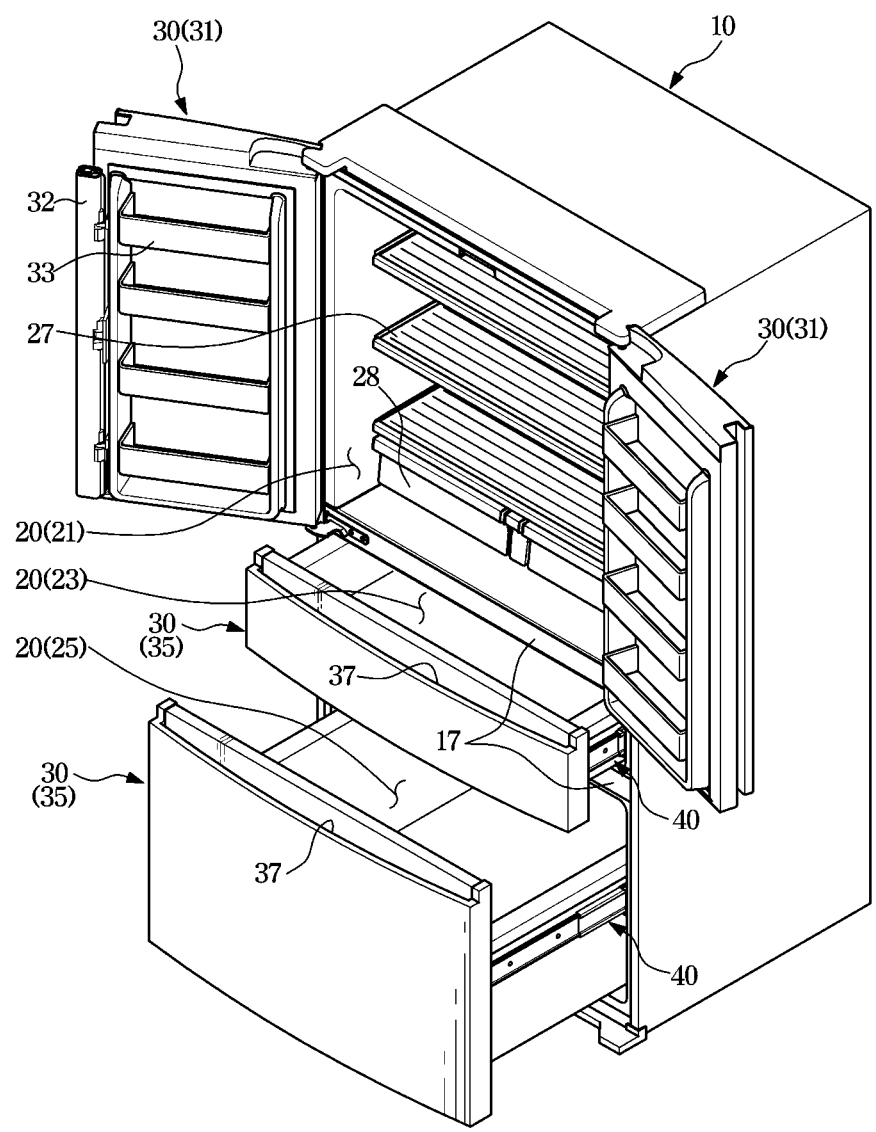
FIG. 1 is a perspective view of a refrigerator according to an embodiment of the disclosure.

Configurations illustrated in the drawings and the embodiments described in the present specification are only examples of the present disclosure, and thus it is to be understood that various modified examples, which may replace the embodiments and the drawings described in the present specification, are possible when filing the present application.

Also, like reference numerals or symbols denoted in the drawings of the present specification represent members or components that perform the substantially same functions.

Also, the terms used in the present specification are merely used to describe the embodiments, and are not intended to limit and/or restrict the disclosure. It is to be understood that the singular forms "a," "an," and "the" include plural referents unless the context clearly dictates otherwise. It will be understood that when the terms "includes," "comprises," "including," and/or "comprising," when used in this specification, specify the presence of stated features, figures, steps, operations, components, members, or combinations thereof, but do not preclude the presence or addition of one or more other features, figures, steps, operations, components, members, or combinations thereof.

Also, it will be understood that, although the terms including ordinal numbers, such as "first", "second", etc., may be used herein to describe various components, these components should not be limited by these terms. These terms are only used to distinguish one component from another. For example, a first component could be termed a second component, and, similarly, a second component could be termed a first component, without departing from the scope of the present disclosure. As used herein, the term "and/or" includes any and all combinations of one or more of associated listed items.

Meanwhile, in the following description, the terms "front end", "rear end", "upper", "lower", "front surface", "rear surface", "upper end", "lower end", etc. are defined based on the drawings, and the shapes and positions of the components are not limited by the terms.

Hereinafter, embodiments of the disclosure will be described in detail with reference to the accompanying drawings.

Figure 2:
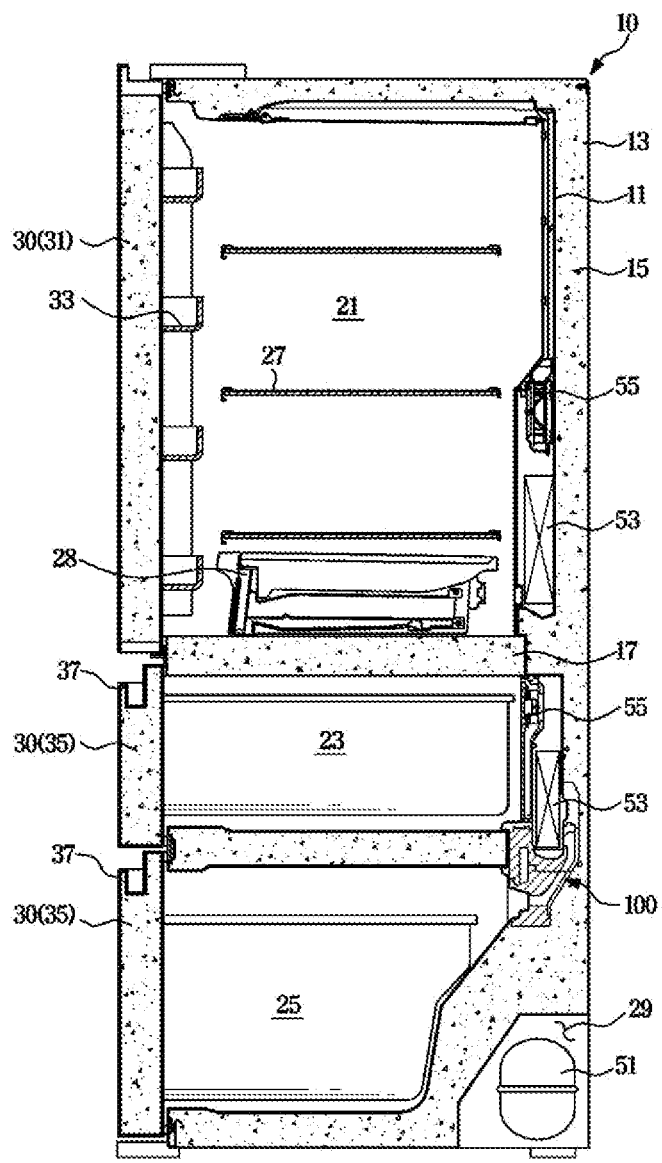
FIG. 2 is a schematic side cross-sectional view of a refrigerator according to an embodiment of the disclosure.

FIG. 1 is a perspective view of a refrigerator according to an embodiment of the disclosure. FIG. 2 is a schematic side cross-sectional view of a refrigerator according to an embodiment of the disclosure.

As shown in FIGS. 1 and 2, a refrigerator may include a main body 10, a plurality of storage rooms 20 formed inside the main body 10, wherein front sides of the storage rooms 20 open, and a door 30 for opening or closing the open front sides of the storage rooms 20.

The main body 10 may include an inner case 11 including the storage room 20, and an outer case 13. An insulator 15 may be foamed between the inner case 11 and the outer case 13 to prevent cool air of the storage room 20 from leaking out.

The main body 10 may include a cool air supplier for supplying cool air to the storage room 20. The cool air supplier may include a compressor 51, a condenser, an expansion valve, an evaporator 53, a blow fan 55, a cool air duct 57, etc.

In a rear lower portion of the main body 10, a machine room 29 in which the compressor 51 and the condenser for compressing a refrigerant and condensing the compressed refrigerator are installed may be provided.

The evaporator 53 for generating cool air, the blow fan 55 for directing cool air generated by the evaporator 53 to inside of the storage room 20, and the cool air duct 57 for guiding cool air generated by the evaporator 53 to the storage room 20 may be disposed on a rear wall of the storage room 20. Each of the evaporator 53, the blow fan 55, and the cool air duct 57 may be configured with a plurality of units to independently supply cool air to the storage rooms 20.

The storage room 20 may be partitioned into a plurality of rooms by a partition wall 17. The storage room 20 may be partitioned into an upper room 21, a middle room 23, and a lower room 25 in order in an up-down direction by the partition wall 17. Each of the upper room 21, the middle room 23, and the lower room 25 may keep food refrigerated or frozen as necessary.

In the upper room 21, a plurality of shelves 27 may be provided to partition the upper room 21 into a plurality of spaces. In the upper room 21, a plurality of storage containers 28 for storing food, etc. may be provided.

The door 30 may include a side-by-side type door 31 rotatably coupled to the main body 10 to open or close the upper room 21. The side-by-side type door 31 may include a handle 32 that may be gripped by a user to open or close the side-by-side type door 31. A plurality of door guards 33 for accommodating food, etc. may be installed on a rear surface of the side-by-side type door 31.

The door 30 may include a drawer type door 35 that is slidingly movable with respect to the main body 10 to open or close each of the middle room 23 and the lower room 25. The drawer type door 35 may include a handle 37 that may be gripped by a user to open or close the drawer type door 35.

The drawer type door 35 may be inserted into or withdrawn from the middle room 23 and the lower room 25 in a sliding manner by a sliding device 40. One side of the sliding device 40 for slidingly moving the drawer type door 35 may be coupled to both inner side walls of each of the middle room 23 and the lower room 25 in which the drawer type door 35 is accommodated, and another side may be coupled to both side surfaces of the drawer type door 35.

The evaporator 53 may be mounted on a rear plate or rear inner surface of the inner case 11 defining the storage room 20. The evaporator 53 may generate cool air according to an operation of the compressor 51. The generated cool air may freeze/refrigerate each storage room 20 according to a flow of the cool air that is forcedly blown to the storage room 20 by the blow fan 55 and then returns, thereby keeping food stored in the corresponding storage room 20 fresh for a long time.

In a process of the cool air flow, vapor around the evaporator 53 may be saturated in air due to a temperature difference between cool air being at an extremely low temperature around the evaporator 53 and warm air being at an increased temperature by exchanging heat with stored items accommodated in the storage room 20 while circulating inside the storage room 20. That is, the vapor may reach a dew point so as to be no longer saturated in the air around the evaporator 53 and form dew on the surface of the evaporator 53. The dew may be frozen by the low temperature of the surface of the evaporator 53 to change into frost.

Accordingly, the refrigerator may interrupt, upon satisfaction of a preset condition during an operation, all operations, and drive a defrost heater installed below the evaporator 53 to perform a defrosting process for removing frost formed on the surface of the evaporator 53. During the defrosting process, the frost may melt to generate defrost water. The defrost water may fall to a drain device 100 disposed below the evaporator 53. The defrost water fallen to the drain device 100 may be discharged to outside of the refrigerator through a drain hose 137 connected to a drain hole (see FIGS. 5 and 6).

Figure 3:
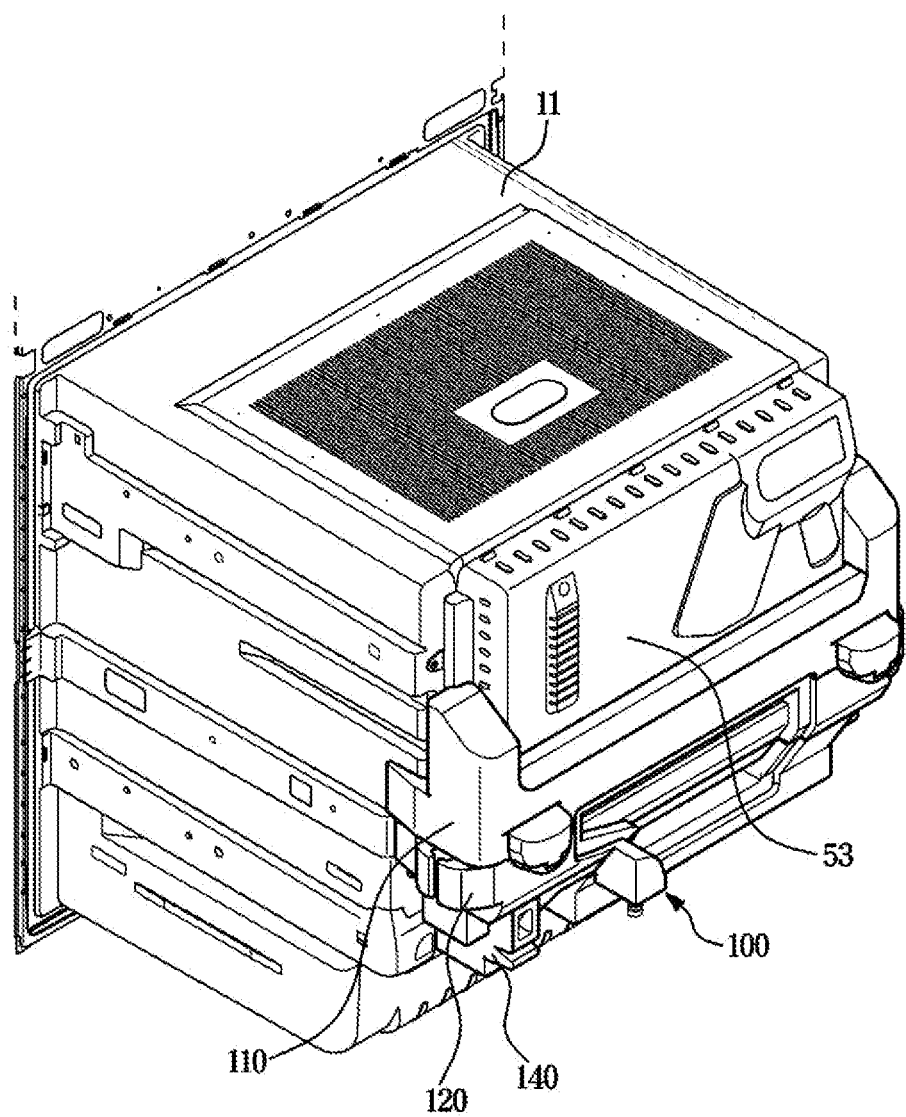
FIG. 3 shows a state in which a drain device is disposed below an evaporator mounted on a rear plate of an inner case according to an embodiment of the disclosure.
Figure 4:
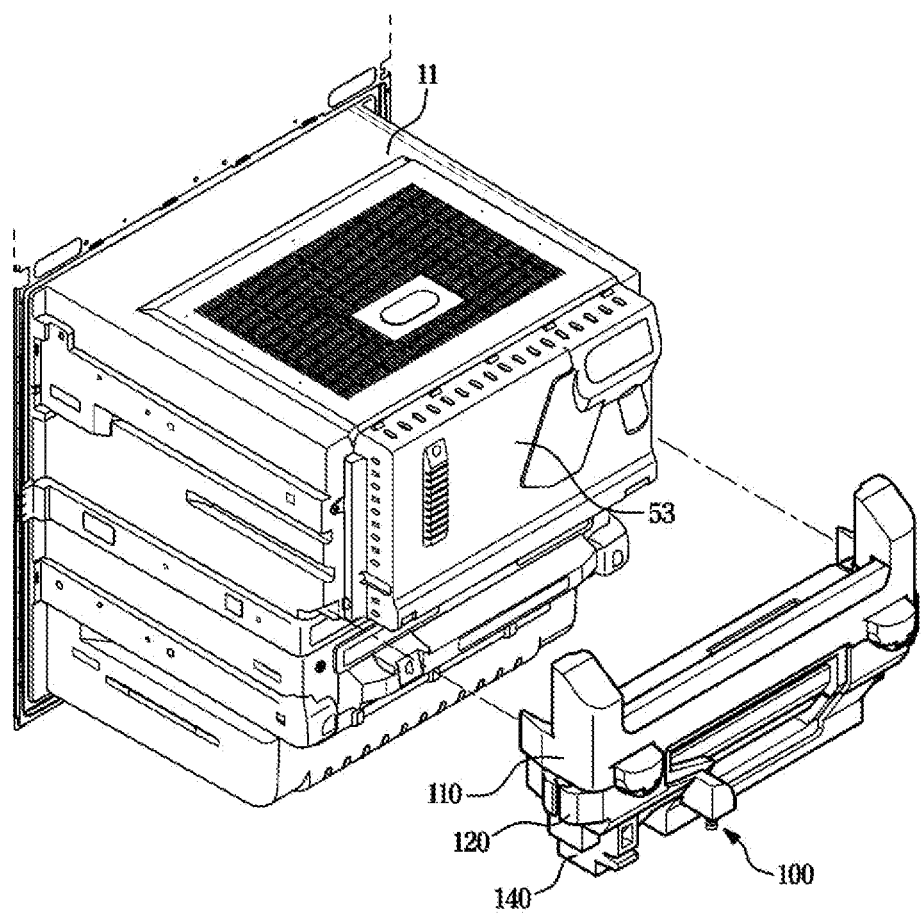
FIG. 4 shows a state in which a drain device according to an embodiment of the disclosure with an inner case.
Figure 5:
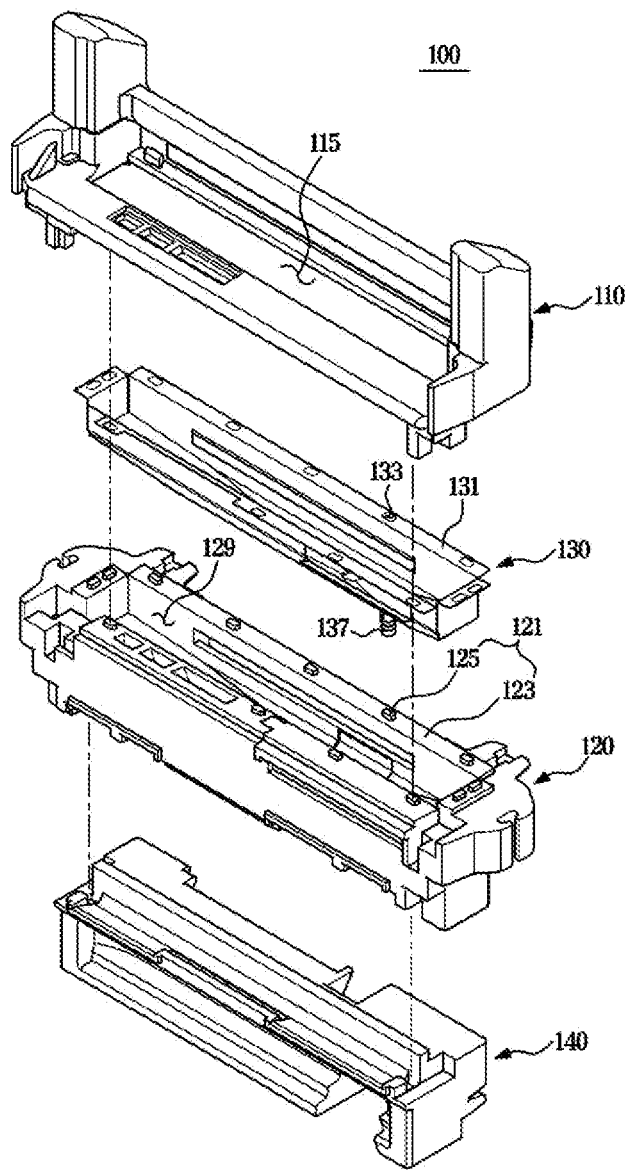
FIG. 5 is an exploded perspective view of a drain device according to an embodiment of the disclosure.
Figure 6:
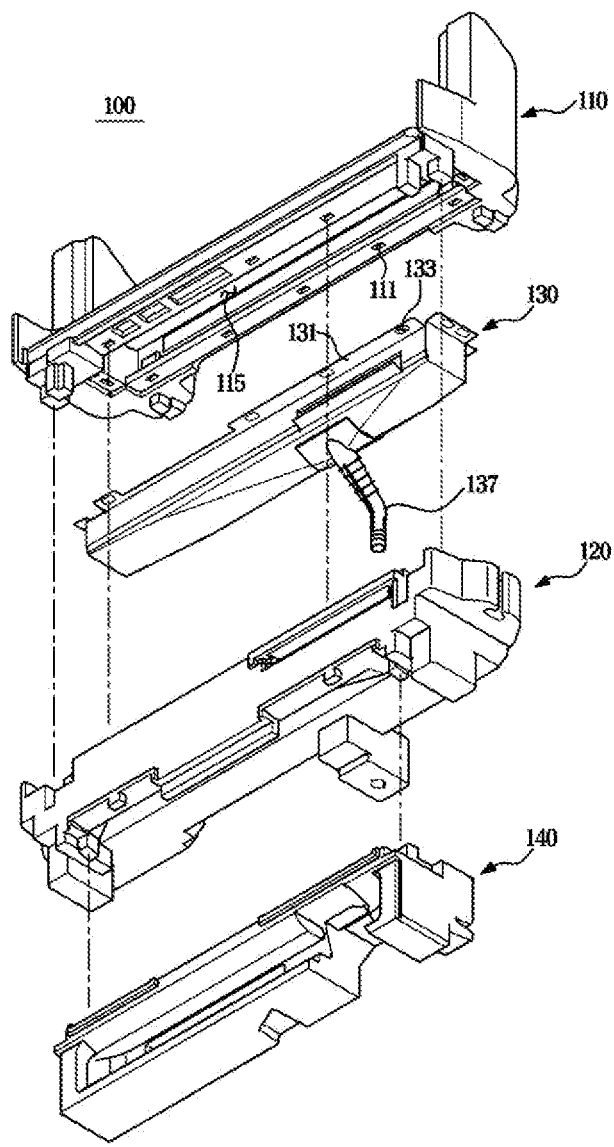
FIG. 6 shows the drain device shown in FIG. 5 from a another perspective.
Figure 7:
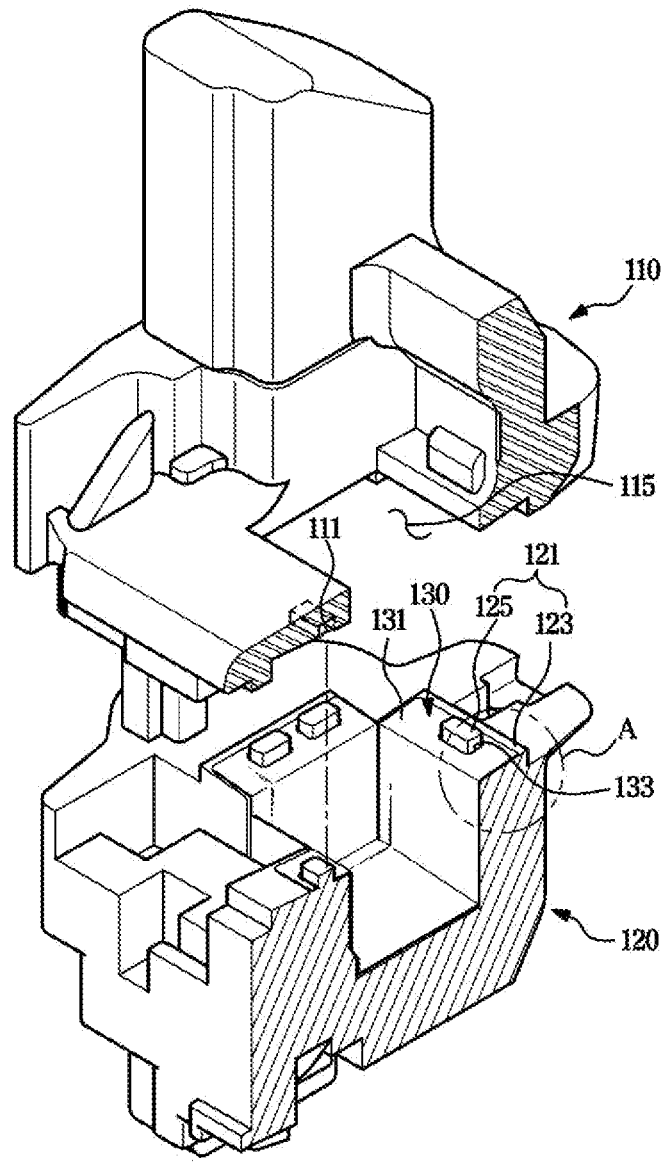
FIG. 7 shows a state in which a middle insulator to which a drain housing according to an embodiment of the disclosure is fixed is assembled with an upper insulator.
Figure 8:
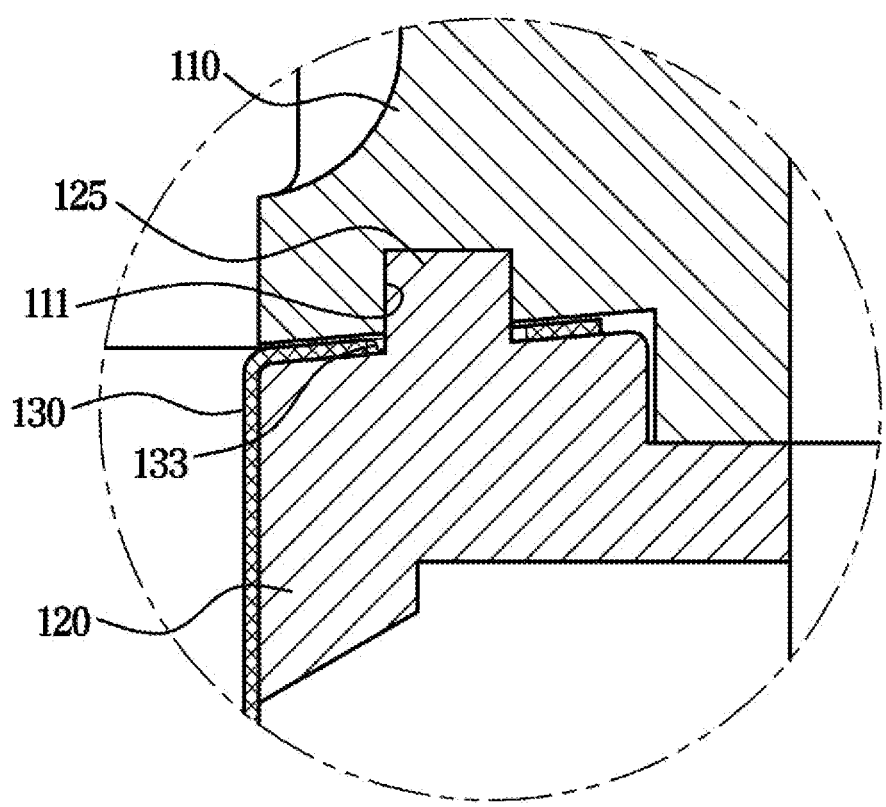
FIG. 8 is an enlarged cross-sectional view of an area A of FIG. 7.

FIG. 3 shows a state in which a drain device is disposed below an evaporator mounted on a rear plate of an inner case according to an embodiment of the disclosure. FIG. 4 shows a state in which a drain device according to an embodiment of the disclosure is assembled with an inner case. FIG. 5 is an exploded perspective view of a drain device according to an embodiment of the disclosure. FIG. 6 shows the drain device shown in FIG. 5 in another direction. FIG. 7 shows a state in which a middle insulator to which a drain housing according to an embodiment of the disclosure is fixed is assembled with an upper insulator. FIG. 8 is an enlarged cross-sectional view of an A area of FIG. 7.

As shown in FIGS. 3 to 8, the drain device 100 may be disposed below the evaporator 53. The drain device 100 may include an upper insulator 110 disposed on the rear plate or rear inner surface of the inner case 11. The drain device 100 may include a middle insulator 120 disposed on a lower portion of the upper insulator 110. The drain device 100 may include a drain housing 130 disposed between the upper insulator 110 and the middle insulator 120 to drain defrost water. The drain device 100 may include a lower insulator 140 disposed on a lower portion of the middle insulator 120.

The upper insulator 110 may be disposed on the rear plate of the inner case 11. The upper insulator 110 may include a plurality of fixing grooves 111 formed in the lower portion. The plurality of fixing grooves 111 may be formed at locations corresponding to a plurality of fixing protrusions 125 formed on the middle insulator 120 and a plurality of fixing holes 122 formed in the drain housing 130, which will be described below. The plurality of fixing protrusions 125 formed in the middle insulator 120 may penetrate the plurality of fixing holes 133 formed in the drain housing 130 and be fixed to the plurality of fixing grooves 111 formed in the upper insulator 110.

The upper insulator 110 may include an opening 115 formed in a center portion. Defrost water falling from the evaporator 53 may fall to inside of the drain housing 120 disposed below the upper insulator 110 through the opening 115.

The upper insulator 110 may press an upper portion of the drain housing 130 such that the drain housing 130 disposed between the upper insulator 110 and the middle insulator 120 is in disposed next to the middle insulator 120.

The middle insulator 120 may be disposed on the lower portion of the upper insulator 110. The middle insulator 120 may include a fixing portion 121 to which the drain housing 130 is fixed.

The fixing portion 121 may include a rib 123 being in a shape of a rectangle and formed in the upper portion of the middle insulator 120. The fixing portion 121 may include the plurality of fixing protrusions 125 protruding from an upper portion of the rib 123 toward the upper insulator 110. The plurality of fixing protrusions 125 may penetrate the plurality of fixing holes 133 of the drain housing 130, which will be described below. Accordingly, the drain housing 130 may be fixed to the middle insulator 120. Thereby, the drain housing 130 may be fixed to the middle insulator 120 without using an attachment member, such as a tape, an adhesive, etc. Also, the plurality of fixing protrusions 125 may be fixed to the plurality of fixing grooves 111 of the upper insulator 110.

The middle insulator 120 may include an accommodating portion 129 in which the drain housing 130 is accommodated. The drain housing 130 may be fixed to the middle insulator 120 by the plurality of fixing protrusions 125 penetrating the plurality of fixing holes 133 in a state of being accommodated in the accommodating portion 129. The fixing portion 121 of the middle insulator 120 may be provided at an upper edge of the accommodating portion 129.

The drain housing 130 may be in a shape of a rectangular box or trough of which an upper side opens. The drain housing 130 may include an extension portion 131 extending from upper portions of four sides of the drain housing 130 to correspond to the rib 123 of the middle insulator 120. The extension portion 131 may be inclined such that falling defrost water flows toward the inside of the drain housing 130. Portions of the upper insulator 110 and the middle insulator 120, corresponding to the extension portion 131 inclined, may also be inclined.

The extension portion 131 may include the plurality of fixing holes 133 which the plurality of fixing protrusions 125 formed in the middle insulator 120 penetrate and are fixed to. The drain housing 130 may be fixed to the middle insulator 120 by the plurality of fixing protrusions 125 penetrating the plurality of fixing holes 133 in a state of being accommodated in the accommodating portion 129 of the middle insulator 120.

The drain housing 130 may include the drain hole for draining defrost water fallen to the inside of the drain housing 130. The drain housing 130 may include the drain hose 137 connected to the drain hole to drain defrost water.

The lower insulator 140 may be disposed on the lower portion of the middle insulator 120.

Figure 9:
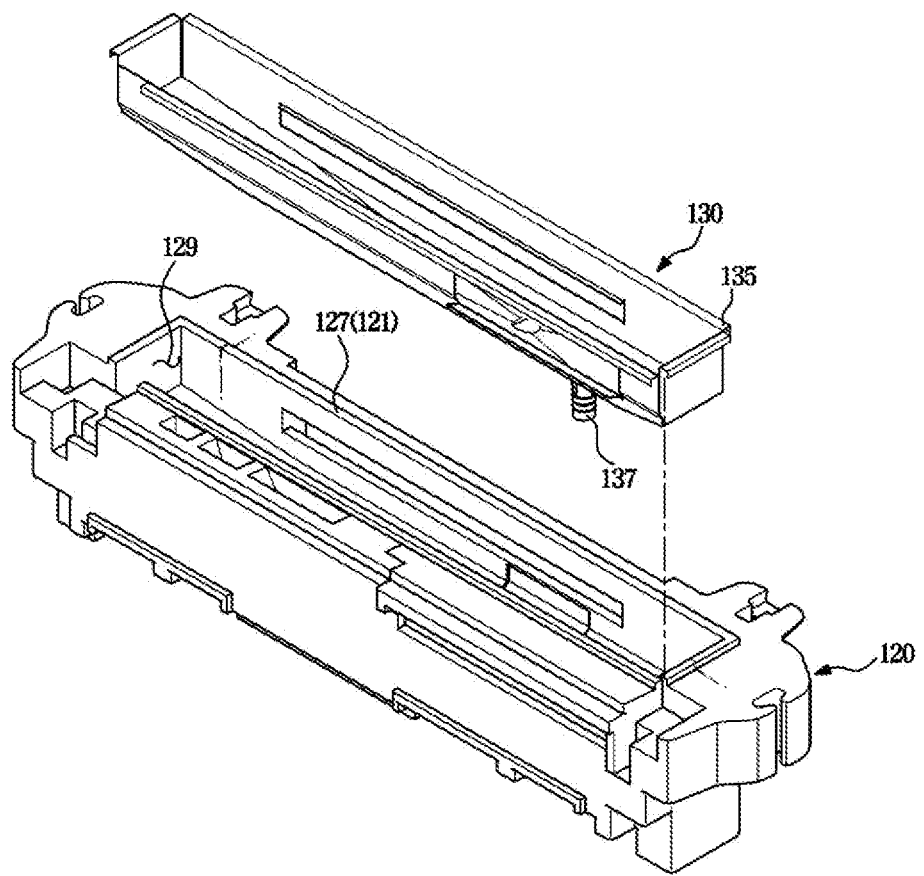
FIG. 9 shows a state in which a drain housing according to another embodiment of the disclosure is fixed to a middle insulator.
Figure 10:
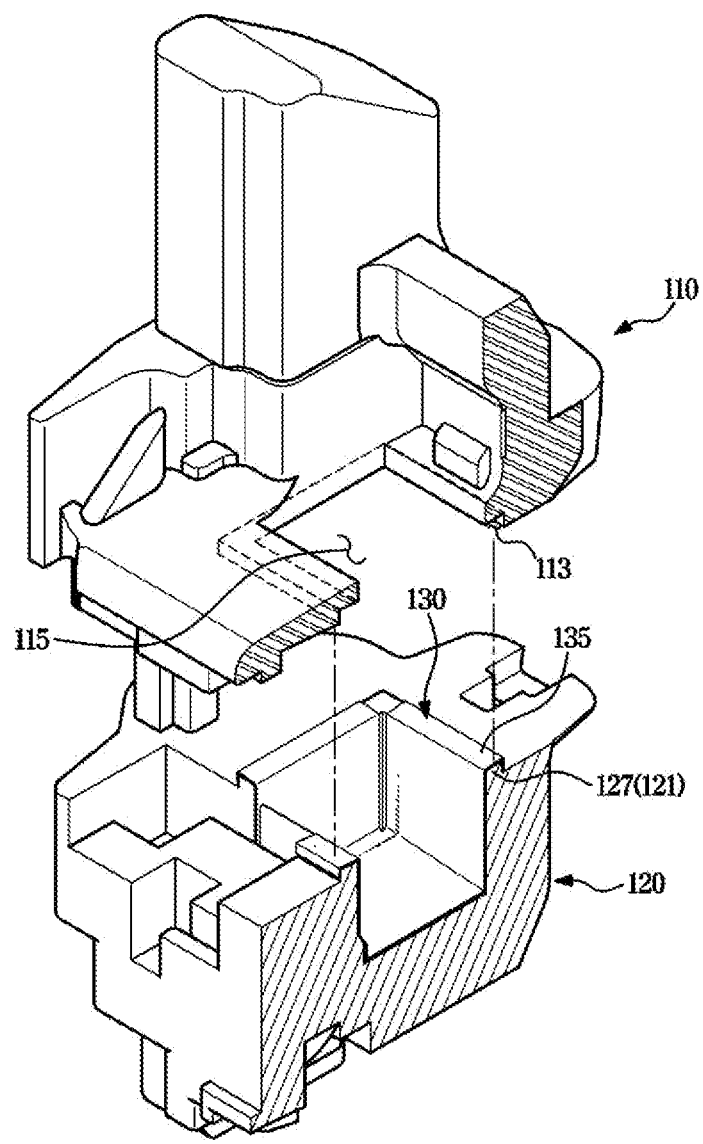
FIG. 10 shows a state in which a middle insulator to which a drain housing according to another embodiment of the disclosure is fixed is assembled with an upper insulator.

FIG. 9 shows a state in which a drain housing according to another embodiment of the disclosure is fixed to a middle insulator. FIG. 10 shows a state in which a middle insulator to which a drain housing according to another embodiment of the disclosure is fixed is assembled with an upper insulator.

As shown in FIGS. 9 and 10, an upper insulator 110 may include an inserting groove 113 formed in a lower portion. The inserting groove 113 may be formed at a location corresponding to a fixing rib 127 formed in a middle insulator 120, which will be described below. The fixing rib 127 of the middle insulator 120 that is disposed on the lower portion of the upper insulator 110 may be inserted in the inserting groove 113. Thereby, the middle insulator 120 may be fixed to the upper insulator 110.

The upper insulator 110 may include an opening 115 formed in the center portion. Defrost water fallen from the evaporator 53 (see FIG. 3) may fall to inside of a drain housing 130 disposed below the upper insulator 110 through the opening 115.

The upper insulator 110 may press an upper portion of the drain housing 130 disposed between the upper insulator 110 and the middle insulator 120 such that the drain housing 130 is in contact with the middle insulator 120.

The middle insulator 120 may be disposed on the lower portion of the upper insulator 110. The middle insulator 120 may include a fixing portion 121 to which the drain housing 130 is fixed. The fixing portion 121 may include a fixing rib 127 integrally formed with an upper portion of the middle insulator 120, wherein the fixing rib 127 is rectangular, and protruding toward the upper insulator 110. The fixing rib 127 may be inserted in a bending portion 135 of the drain housing 130, which will be described below. By inserting the fixing rib 127 formed in the middle insulator 120 in the bending portion 135 of the drain housing 130, the drain housing 130 may be fixed to the middle insulator 120. Thereby, the drain housing 130 may be fixed to the middle housing 120 without using an attachment member, such as a tape, an adhesive, etc. Also, the fixing rib 127 may be fixed to the inserting groove 113 of the upper insulator 110.

The middle insulator 120 may include an accommodating portion 129 in which the drain housing 130 is accommodated. The drain housing 130 may be fixed to the middle insulator 120 by the fixing rib 127 inserted in the bending portion 135 in a state of being accommodated in the accommodating portion 129.

The drain housing 130 may be in a shape of a rectangular box or trough of which an upper side opens. The drain housing 130 may include the bending portion 135 extending from upper portions of four sides of the drain housing 130 to correspond to the fixing rib 127 of the middle insulator 120. The bending portion 135 may be inclined such that falling defrost water flows toward the inside of the drain housing 130. Portions of the upper insulator 110 and the middle insulator 120, corresponding to the bending portion 135 inclined, may also be inclined.

The bending portion 135 may be bent to a "⊏" shape such that the fixing rib 127 formed in the middle insulator 120 is inserted in the bending portion 135. That is, the bending portion 135 may be formed in a "⊏" shape of which a lower side opens, and the fixing rib 127 may be inserted in the bending portion 135 through the open lower side. The drain housing 130 may be fixed to the middle insulator 120 by the fixing rib 127 inserted in the bending portion 135 in a state of being accommodated in the accommodating portion 129 of the middle insulator 120.

The drain housing 130 may include a drain hole for draining defrost water fallen to the inside of the drain housing 130. The drain housing 130 may include a drain hose 137 connected to the drain hoe to drain defrost water.

Figure 11:
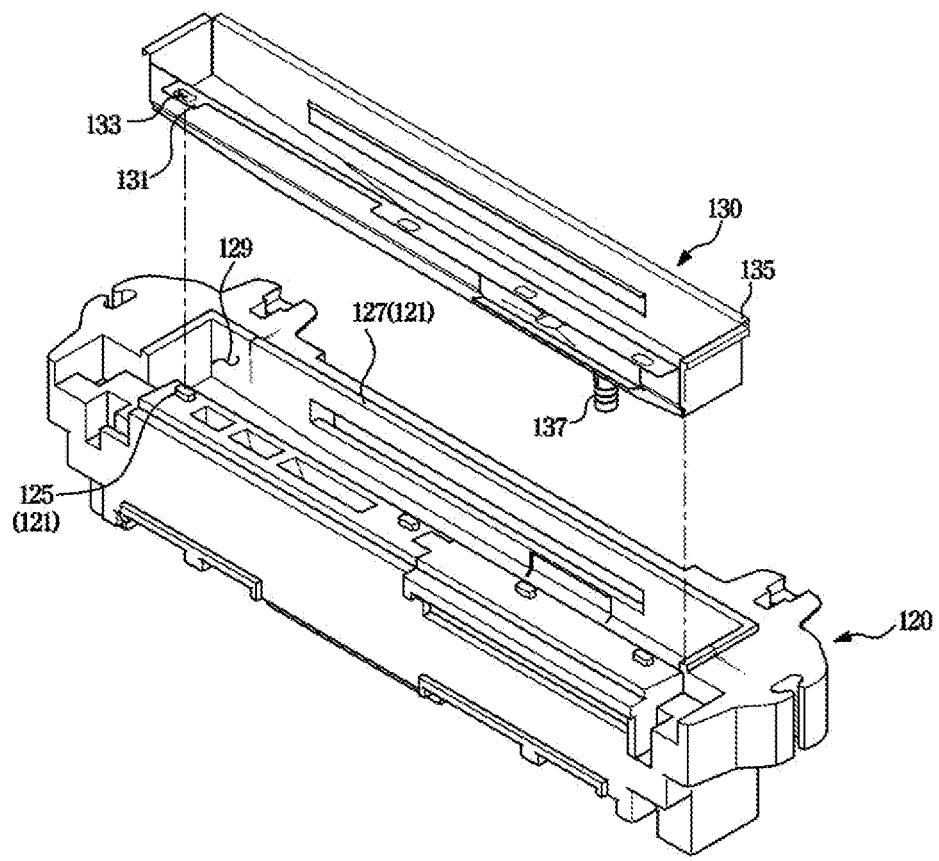
FIG. 11 shows a state in which a drain housing according to another embodiment of the disclosure is fixed to a middle insulator.
Figure 12:
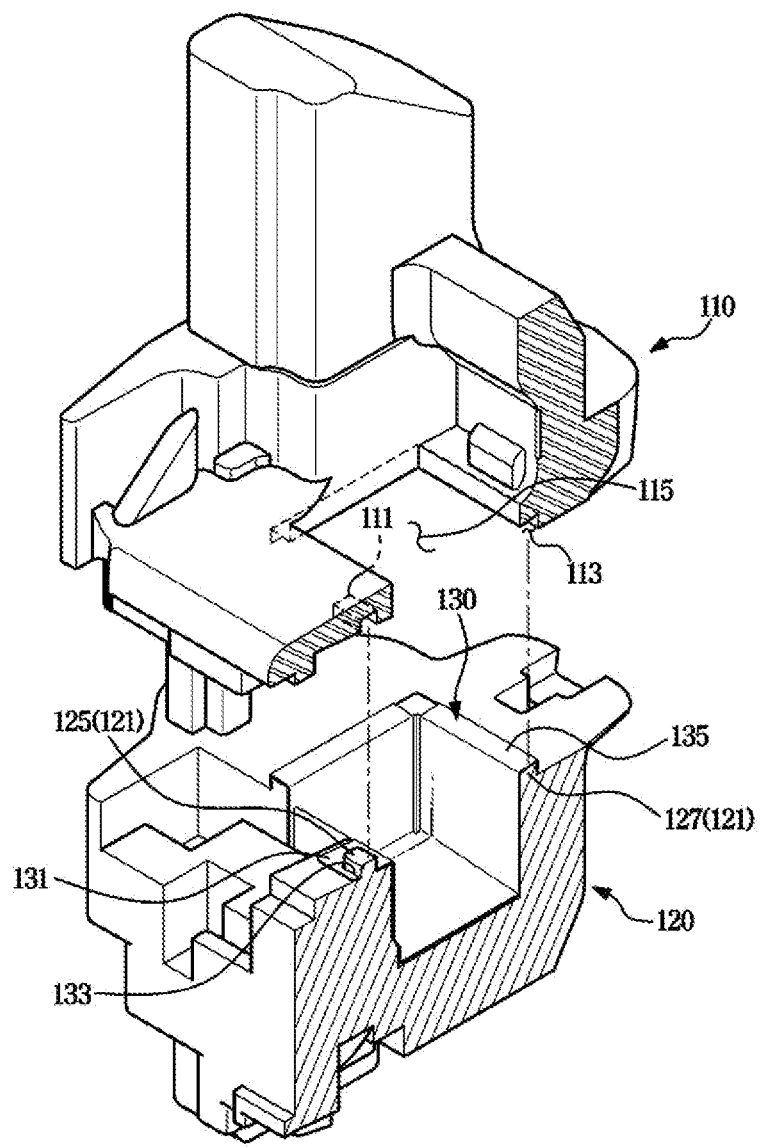
FIG. 12 shows a state in which a middle insulator to which a drain housing according to another embodiment of the disclosure with an upper insulator.

FIG. 11 shows a state in which a drain housing according to another embodiment of the disclosure is fixed to a middle insulator. FIG. 12 shows a state in which a middle insulator to which a drain housing according to another embodiment of the disclosure with an upper insulator.

As shown in FIGS. 11 and 12, an upper insulator 110 may include a plurality of fixing grooves 111 and an inserting groove 113 formed in a lower portion.

The plurality of fixing grooves 111 may be formed at locations corresponding to a plurality of fixing protrusions 125 formed in a middle insulator 120 and a plurality of fixing holes 133 formed in a drain housing 130, which will be described below. The plurality of fixing protrusions 125 formed in the middle insulator 120 may penetrate the plurality of fixing holes 133 formed in the drain housing 130 and be fixed to the plurality of fixing grooves 111 formed in the upper insulator 110.

An inserting groove 113 may be formed at a location corresponding to a fixing rib 127 formed in the middle insulator 120, which will be described below. The fixing rib 127 of the middle insulator 120 that is disposed on the lower portion of the upper insulator 110 may be inserted in the inserting groove 113. Thereby, the middle insulator 120 may be fixed to the upper insulator 110.

The upper insulator 110 may include an opening 115 formed in a center portion. Defrost water falling from the evaporator 53 may fall to the inside of the drain housing 130 disposed below the upper insulator 110 through the opening 115.

The upper insulator 110 may press an upper portion of the drain housing 130 disposed between the upper insulator 110 and the middle insulator 120 such that the drain housing 130 is in contact with the middle insulator 120.

The middle insulator 120 may be disposed on the lower portion of the upper insulator 110. The middle insulator 120 may include a fixing portion 121 to which the drain housing 130 is fixed.

The fixing portion 121 may include a rib 123 being in a shape of a rectangle and formed in an upper portion of the middle insulator 120. The rib 123 may be formed only in one side of four sides of the rectangular shape. The fixing portion 121 may include a plurality of fixing protrusions 125 protruding from an upper portion of the rib 123 toward the upper insulator 110. The plurality of fixing protrusions 125 may penetrate the plurality of fixing holes 133 of the drain housing 130, which will be described below. Accordingly, the drain housing 130 may be fixed to the middle insulator 120.

The fixing portion 121 may include a fixing rib 127 integrally formed with the upper portion of the middle insulator 120, wherein the fixing rib 127 is rectangular, and protruding toward the upper insulator 110. The fixing rib 127 may be formed in three sides of the four sides of the rectangular shape, except for the side in which the rib 123 is formed. The fixing rib 127 may be inserted in a bending portion 135 of the drain housing 130, which will be described below. By inserting the fixing rib 127 formed in the middle insulator 120 in the bending portion 135 of the drain housing 130, the drain housing 130 may be fixed to the middle insulator 120.

Thereby, the drain housing 130 may be fixed to the middle insulator 120 without using an attachment member, such as a tape, an adhesive, etc. Also, the plurality of fixing protrusions 125 may be fixed to the plurality of fixing grooves 111 of the upper insulator 110, and the fixing rib 127 may be fixed to the inserting groove 113 of the upper insulator 110.

The middle insulator 120 may include an accommodating portion 129 in which the drain housing 130 is accommodated. The drain housing 130 may be fixed to the middle insulator 120 by the plurality of fixing protrusions 125 penetrating the plurality of fixing holes 133 and the fixing rib 127 inserted in the bending portion 135 in a state of being accommodated in the accommodating portion 129.

The drain housing 130 may have a shape of a rectangular trough of which an upper side opens. The drain housing 130 may include an extension portion 131 extending from an upper portion of one side of four sides of the drain housing 130 to correspond to the rib 123 of the middle insulator 120. The extension portion 131 may be inclined such that falling defrost water flows toward the inside of the drain housing 130. Portions of the upper insulator 110 and the middle insulator 120, corresponding to the extension portion 131 inclined, may also be inclined.

The extension portion 131 may include the plurality of fixing holes 133 which the plurality of fixing protrusions 125 formed in the middle insulator 120 penetrate and are fixed to. The drain housing 130 may be fixed to the middle insulator 120 by the plurality of fixing protrusions 125 penetrating the plurality of fixing holes 133 in a state of being accommodated in the accommodating portion 129 of the middle insulator 120.

The drain housing 130 may include the bending portion 135 extending from upper portions of three sides of the four sides of the drain housing 130 to correspond to the fixing rib 127 of the middle insulator 120, except for the side in which the rib 123 is formed. The bending portion 135 may be inclined such that falling defrost water flows toward the inside of the drain housing 130. Portions of the upper insulator 110 and the middle insulator 120, corresponding to the bending portion 135 inclined, may also be inclined.

The bending portion 135 may be bent to a "⊏" shape such that the fixing rib 127 formed in the middle insulator 120 is inserted in the bending portion 135. That is, the bending portion 135 may be formed in a "⊏=" shape of which a lower side opens, and the fixing rib 127 may be inserted in the bending portion 135 through the open lower side. The drain housing 130 may be fixed to the middle insulator 120 by the fixing rib 127 inserted in the bending portion 135 in a state of being accommodated in the accommodating portion 129 of the middle insulator 120.

In the drawings, the plurality of fixing protrusions 125 of the middle insulator 120, the plurality of fixing holes 133 of the drain housing 130, and the plurality of fixing grooves 111 of the upper insulator 110 are shown to be formed in one side of the four sides of the rectangle shape, although not limited thereto. That is, the plurality of fixing protrusions 125 of the middle insulator 120, the plurality of fixing holes 133 of the drain housing 130, and the plurality of fixing grooves 111 of the upper insulator 110 may be formed in three sides of the four sides of the rectangle shape. In this case, the fixing rib 127 of the middle insulator 120, the bending portion 135 of the drain housing 130, and the inserting groove 113 of the upper insulator 110 may be formed in the remaining one side of the four sides of the rectangular shape. Also, the above-mentioned components may be formed in each of two sides of the four sides of the rectangular shape.

The drain housing 130 may include a drain hole for draining defrost water fallen to the inside of the drain housing 130. The drain housing 130 may include a drain hose 137 connected to the drain hole to drain defrost water.

Although embodiments of the refrigerator have been described with reference to the accompanying drawings, it should be interpreted that various modifications and changes are possible by one of ordinary skill in the related art and the modifications and changes belong to the scope of rights of the disclosure.

What is claimed is:
1. A refrigerator comprising:
an inner case defining a storage room;
an outer case coupled to an outer side of the inner case;
an insulator between the inner case and the outer case;
an evaporator disposed on a rear inner surface of the inner case; and a drain device disposed below the evaporator and configured to drain defrost water falling from the evaporator,
wherein the drain device comprises:
an upper insulator disposed on the rear inner surface of the inner case;
a drain housing disposed below the upper insulator and through with the defrost water is drained, the drain housing comprising an extension portion extending from an upper portion of at least one side of the drain housing, the extension portion comprising at least one fixing hole thereon; and
a middle insulator disposed on a lower portion of the upper insulator, such that the drain housing is between the upper insulator and the middle insulator, the middle insulator comprising a fixing portion that penetrates the at least one fixing hole and to which the drain housing is fixed.

2. The refrigerator of claim 1, wherein the fixing portion comprises:
a rib provided in an upper portion of the middle insulator and a rectangular shape; and
a plurality of fixing protrusions protruding from an upper portion of the rib toward the upper insulator.

3. The refrigerator of claim 2, wherein the middle insulator comprises an accommodating portion in which the drain housing is accommodated, and
wherein the fixing portion is provided at an upper edge of the accommodating portion.

4. The refrigerator of claim 1, wherein the upper insulator presses the upper portion of the drain housing disposed between the upper insulator and the middle insulator such that the drain housing contacts the middle insulator.

5. The refrigerator of claim 1, wherein the fixing portion comprises a fixing rib integrally formed with an upper portion of the middle insulator, the fixing rib having rectangular shape and protruding toward the upper insulator.

6. The refrigerator of claim 1, wherein the fixing portion comprises:
a plurality of fixing protrusions protruding from at least one surface of upper surfaces of the middle insulator toward the upper insulator; and
a fixing rib integrally formed with the middle insulator in a remaining upper surface of the middle insulator and protrudes toward the upper insulator.

7. The refrigerator of claim 6, wherein the drain housing has a rectangular trough shape of which an upper side is open,
wherein the drain housing further comprises a bending portion,
wherein the at least one fixing hole comprises a plurality of fixing holes provided at locations corresponding to the plurality of fixing protrusions in the extension portion,
wherein the plurality of fixing protrusions penetrate the plurality of fixing holes,
wherein the bending portion is provided at a location corresponding to the fixing rib, and
wherein the fixing rib is inserted in the bending portion.

8. The refrigerator of claim 7, wherein the upper insulator comprises a plurality of fixing grooves and an inserting groove,
wherein the plurality of fixing grooves are provided in the lower portion of the upper insulator to correspond to the plurality of fixing holes,
wherein the plurality of fixing protrusions are fixed to the plurality of fixing grooves, and
wherein the inserting groove is provided in the lower portion of the upper insulator to correspond to the fixing rib, and the fixing rib is inserted in and fixed to the inserting groove.

9. A refrigerator comprising:
an inner case defining a storage room;
an outer case coupled to an outer side of the inner case;
an insulator between the inner case and the outer case;
an evaporator disposed on a rear inner surface of the inner case; and
a drain device disposed below the evaporator and configured to drain defrost water falling from the evaporator,
wherein the drain device comprises:
an upper insulator disposed on the rear inner surface of the inner case;
a drain housing disposed below the upper insulator and through with the defrost water is drained; and
a middle insulator disposed on a lower portion of the upper insulator, such that the drain housing is between the upper insulator and the middle insulator, the middle insulator comprising a fixing portion to which the drain housing is fixed,
wherein the fixing portion comprises:
a rib provided in an upper portion of the middle insulator and a rectangular shape; and
a plurality of fixing protrusions protruding from an upper portion of the rib toward the upper insulator,
wherein the middle insulator comprises an accommodating portion in which the drain housing is accommodated,
wherein the fixing portion is provided at an upper edge of the accommodating portion,
wherein the drain housing has a rectangular trough shape and an upper side of the drain housing opens, and
wherein the drain housing comprises an extension portion extending from an upper portion of each of four sides of the drain housing to correspond to the rib.

10. The refrigerator of claim 9, wherein the extension portion comprises a plurality of fixing holes which the plurality of fixing protrusions penetrate and are fixed to.

11. The refrigerator of claim 10, wherein the upper insulator comprises a plurality of fixing grooves provided in the lower portion of the upper insulator to correspond to the plurality of fixing holes, and
wherein the plurality of fixing protrusions are fixed to the plurality of fixing grooves.

12. The refrigerator of claim 9, wherein the extension portion is inclined such that the defrost water flows to inside of the drain housing.

13. A refrigerator comprising:
an inner case defining a storage room;
an outer case coupled to an outer side of the inner case;
an insulator between the inner case and the outer case;
an evaporator disposed on a rear inner surface of the inner case; and
a drain device disposed below the evaporator and configured to drain defrost water falling from the evaporator,
wherein the drain device comprises:
an upper insulator disposed on the rear inner surface of the inner case;
a drain housing disposed below the upper insulator and through with the defrost water is drained; and
a middle insulator disposed on a lower portion of the upper insulator, such that the drain housing is between the upper insulator and the middle insulator, the middle insulator comprising a fixing portion to which the drain housing is fixed, wherein the fixing portion comprises a fixing rib integrally formed with an upper portion of the middle insulator, the fixing rib having rectangular shape and protruding toward the upper insulator, wherein the drain housing has a rectangular trough shape of which an upper side is open, and wherein the drain housing comprises a bending portion extending from an upper portion of each of four sides of the drain housing to correspond to the fixing rib.

14. The refrigerator of claim 13, wherein the bending portion has a bent shape of which a lower side is open such that the fixing rib is inserted in and fixed to the bending portion.

15. The refrigerator of claim 14, wherein the upper insulator includes an inserting groove provided in the lower portion of the upper insulator to correspond to the fixing rib, and wherein the fixing rib is inserted in and fixed to the inserting groove.

* * * * *